United States Patent [19]

Chen et al.

[11] Patent Number: 4,886,856
[45] Date of Patent: Dec. 12, 1989

[54] FUNCTIONALIZED ELASTOMERS BLENDED WITH POLAR COPOLYMERS OF STYRENE AND ACRYLIC ACID METHACRYLIC ACID OR MALEIC ANHYDRIDE

[75] Inventors: Bibiana S. Y. Chen; David E. Henton, both of Midland, Mich.

[73] Assignee: The Dow Chemical Company, Midland, Mich.

[21] Appl. No.: 125,791

[22] Filed: Nov. 27, 1987

Related U.S. Application Data

[62] Division of Ser. No. 899,173, Aug. 21, 1986, abandoned.

[51] Int. Cl.$^4$ ............ C08L 25/08; C08F 255/06; C08F 279/02
[52] U.S. Cl. ........................ 525/73; 525/74; 525/279; 525/286; 525/78
[58] Field of Search ..................... 525/73, 74

[56] References Cited

U.S. PATENT DOCUMENTS

| 3,660,525 | 5/1972 | Kawahara et al. | 525/286 |
| 4,034,013 | 7/1977 | Lane | 525/286 |
| 4,086,300 | 4/1978 | Owens et al. | 525/66 |
| 4,187,202 | 2/1980 | Kondo et al. | 525/279 |
| 4,247,671 | 1/1981 | Reitz et al. | 524/808 |
| 4,340,689 | 7/1982 | Joffrion | 525/279 |
| 4,447,582 | 5/1984 | Gros | 525/279 |
| 4,528,329 | 7/1985 | Inoue et al. | 525/74 |
| 4,590,241 | 5/1986 | Hohlfeld | 525/73 |
| 4,614,763 | 9/1986 | Trabert et al. | 525/66 |
| 4,721,752 | 1/1988 | Schepers et al. | 525/74 |

FOREIGN PATENT DOCUMENTS

| 3403576 | 8/1985 | Fed. Rep. of Germany. | |
| 30384 | 12/1969 | Japan. | |
| 0147041 | 8/1984 | Japan | 525/73 |
| 0177069 | 9/1985 | Japan | 525/74 |
| 1353897 | 5/1974 | United Kingdom | 525/286 |

Primary Examiner—Wilbert J. Briggs, Sr.
Attorney, Agent, or Firm—Douglas N. Deline

[57] ABSTRACT

Novel graft copolymer elastomers comprising a rubbery substrate polymer and a graft copolymer of a monomer capable of grafting to the rubbery substrate and a copolymerizable comonomer having pendant reactive groups capable of functionally reacting with reactive polar functionality of a copolymer of a monovinylidene aromatic monomer and a copolymerizable polar comonomer are disclosed.

12 Claims, No Drawings

FUNCTIONALIZED ELASTOMERS BLENDED WITH POLAR COPOLYMERS OF STYRENE AND ACRYLIC ACID METHACRYLIC ACID OR MALEIC ANHYDRIDE

This is a division of application Ser. No. 899,173, filed Aug. 21, 1986, now abandoned.

BACKGROUND OF THE INVENTION

The present invention relates to unique functionalized grafted elastomers. More particularly, the present invention relates to elastomers for impact modification of rigid thermoplastic polymers that have heretofore been impact modifiable only with great difficulty.

In the Japanese Laid Open Publication 44-30384, there is disclosed a method for preparing crosslinked polymers. In Example 2 therein, a crosslinked polyblend formed by mixing a copolymer of styrene and 2-isopropenyl-2-oxazoline and a styrene acrylic acid copolymer is disclosed.

It is previously known to incorporate elastomeric polymers into various thermoplastic resins in order to provide improved stress and impact resistance. One principle method to achieve such improved impact resistant thermoplastic polymers is to blend a previously prepared rubber such as a copolymer of butadiene and styrene having grafted thereto a compatibilizing amount of the polymer or copolymer comprising the matrix phase or a suitable miscible polymer such that upon the blending of the grafted rubber substrate and preformed matrix a compatible blend results. In the preparation of toughened thermoplastics formed by the copolymerization of a monovinylidene aromatic monomer and a copolymerizable polar comonomer, the compatibility of the resulting copolymer with a particular preformed grafted rubber is dependent upon the amount of copolymerizable polar comonomer incorporated into the copolymer matrix. For example, a copolymer of styrene and acrylic acid (SAA) or a copolymer of styrene and maleic anhydride (SMA) containing a small amount of the polar acrylic acid or maleic anhydride comonomer may be compatible with a grafted elastomer containing a certain amount or type of grafter polymer, whereas a different copolymer containing a greater amount or different type of polar comonomer may be incompatible with the same grafted elastomer. In the latter event, blending of the elastomer and the matrix does not result in an improved impact modified thermoplastic resin.

As a consequence of the above described problem, manufacturers who desired to produce impact modified thermoplastics from copolymers having variable polar comonomer contents by the blending technique have been required to manufacture a series of suitable grafted rubber concentrates (GRC) having physical properties adapted for specific incorporation with a limited number of matrices. Such practice has proven to be uneconomical and impractical due to the large variety of rubber products required to be retained in inventory and a limited flexibility and concomitant difficulty in altering existing products.

It would be desirable to provide an improved functionalized grafted rubber concentrate capable of use in a variety of matrices and compatible therewith so as to provide improved toughness and impact resistance.

It would further be desirable to provide a functionalized grafted rubber concentrate for particular use in blending with copolymers comprising a monovinylidene aromatic monomer and a copolymerizable carboxylic acid containing comonomer to provide impact resistant blends.

Finally, it would be particularly desirable to provide a functionalized grafted rubber concentrate for use in preparation of impact resistant blends of styrene acrylic acid copolymers.

SUMMARY OF THE INVENTION

According to the pesent invention, there is now provided a graft copolymer elastomer comprising a rubbery substrate polymer (I) having grafted thereto a graft copolymer (II) comprising pendant groups that are reactive with polar functionality of a copolymer of a monovinylidene aromatic monomer and a copolymerizable polar comonomer to form functionalized reactions there between.

In another aspect, the present invention comprises the above graft copolymer wherein the pendant reactive groups are cyclic iminoether or epoxy groups.

In a final embodiment of the present invention, there is provided an impact resistant blend of the previously described grafted copolymer elastomer and a copolymer of a monovinylidene aromatic monomer and a copolymerizable polar comonomer.

DETAILED DESCRIPTION OF THE INVENTION

Suitable rubbery substrate polymers (I) include any polymer or copolymer which has a glass transistion temperature (Tg) of less than about 0° C. and which may be grafted by the graft copolymer of the present invention. In particular, it is desirable that such substrate polymer contain residual ethylenic unsaturation or other suitable grafting sites, or alternatively may by suitable techniques be modified so as to provide such grafting sites.

Preferred graftable rubbery substrate polymers (I) are homopolymers or copolymers of diolefins. Especially suitable are homopolymers of butadiene, isoprene, etc. and copolymers thereof with one or more copolymerizable comonomers especially styrene, α-methylstyrene, acrylonitrile, etc. Additional, suitable, graftable substrate polymers include copolymers of ethylene and at least one α-olefin containing at least three carbons such as propylene, butylene, etc. commonly referred to as EP rubbers, and interpolymers of ethylene, at least one α-olefin containing at least three carbons, and a diene, referred to as EPDM rubbers. Additional, suitable, graftable substrate polymers are the acrylate rubbers such as homopolymers of an alkylacrylate, especially butylacrylate and copolymers thereof with one or more copolymerizable comonomers such as styrene, α-methylstyrene, acrylonitrile, etc.

In order to provide suitable impact modification according to the present invention and to avoid problems of domain sizing, it is important that the rubbery substrate polymer be presized prior to or during grafting. Suitable volume average particle sizes of the presized rubbery substrate polymer are from about 0.03 to about 3.0 micrometers, and preferably from about 0.1 to 2.0 micrometers, as determined by the technique of measuring representative samples from transmission electron micrographs. Suitably the rubbery substrate may be either an emulsion rubber or a preformed rubber which may be dissolved, then emulsified or otherwise brought into a latex form for graft polymerization, or, alternatively, graft polymerized in a mass or solution polymerization process capable of causing phase inversion and rubber particle formation. Solution, suspension, emulsion and mass polymerization techniques may all be suitably employed.

Preferred for use in the preparation of impact resistant polymers the graftable rubbery substrate polymers have a glass transition temperature ($T_g$) of less than about $-20°$ C. and contain residual amounts of ethylenic unsaturation sufficient to allow ready grafting of the graft copolymer (II) thereto. A most preferred rubbery substrate polymer (I) comprises a polymer of butadiene and, optionally, a copolymerizable comonomer such as styrene prepared by free-radical, emulsion polymerization containing at least about 60 percent by weight butadiene.

The graft copolymer (II) may comprise, for example, the reaction product formed by the addition reaction of a first monomer capable of grafting to the rubbery substrate polymer (I) and a second copolymerizable monomer containing pendant groups capable of reaction with the polar functionality of a copolymer of a monovinylidene aromatic monomer and a copolymerizable polar comonomer. The first monomer and second copolymerizable monomer are combined and polymerized in such a way that the pendant groups are substantially chemically unmodified and thus are available for later functionalizing reactions.

Selection of suitable first monomers for use in the graft copolymer will depend upon the rubbery substrate polymer (I) to which grafting is desired, and also the desirable consequence that the monomer not be reactive with the pendant groups present in the second copolymerizable monomer. Suitably, such monomers are selected from the group consisting of ethylenically unsaturated monomers substantially devoid of reactive hydrogen. Examples include monovinylidene aromatic monomers, ethylenically unsaturated nitrile functional monomers, ethylenically unsaturated carboxylic acid esters having 1 to 4 carbons in the ester group, etc. Preferably for grafting to the highly desirable butadiene homopolymer and styrene butadiene copolymer substrates, a first monomer comprising styrene or a mixture of styrene and acrylonitrile is preferred.

Copolymerizable comonomers containing pendant groups capable of reaction with polar functionality of a copolymer of a monovinylidene aromatic monomer and a polar copolymerizable comonomer according to the present invention include ethylenically unsaturated monomers containing pendant cyclic ether and cyclic iminoether functionality. Suitable monomers are compositions corresponding to the formula:

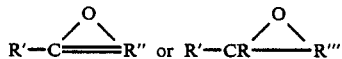

wherein R' is an ethylenically unsaturated addition polymerizable aliphatic radical of up to 8 carbons; R" is a trivalent aliphatic moiety of up to 12 carbons; R"' is a divalent aliphatic moiety of up to 12 carbons; and R is hydrogen, halogen or $C_{1-4}$ alkyl group.

Preferably, the copolymerizable monomer contains a cyclic iminoether or epoxy group and R' is an alkenyl containing group. Suitable copolymerizable comonomers containing pendant groups for use in the present invention are 2-alkenyl-2-oxazolines especially 2-isopropenyl-2-oxazoline, and glycidyl methacrylate. Additional, suitable monomers include those of the formula:

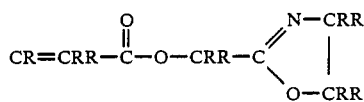

wherein R is as previously defined. Such compositions are disclosed in U.S. Pat. No. 4,247,671 the teachings of which are hereby incorporated by reference.

The amount of second copolymerizable monomer employed in the preparation of the graft copolymer is selected so as to provide the desired degree of functionalization to react with the polar functionality of an interpolymer of a monovinylidene aromatic monomer and a copolymerizable polar comonomer. Because the amount of such polar functionality contained in the polymer or interpolymer sought to be blended with the graft copolymer elastomer may vary, the amount of second copolymerizable monomer employed in the graft copolymer (II) may vary over a relatively large range. Suitably, however, from about 0.1 percent by weight to about 10 percent by weight of copolymerizable comonomer is employed in the graft copolymer (II) of the invention.

The preferred method for preparation of the graft copolymer elastomers of the invention is the well known emulsion grafting process. In this process, the substrate polymer (I) is prepared by addition polymerization of suitable monomer or monomers in the presence of water, an emulsifier, and initiator. Additional suitable ingredients such as a seed latex, antioxidants, crosslinking agents, chain transfer agents, etc. may be employed as desired. Polymerization is continued until a suitable molecular weight or particle size is achieved, where upon polymerization is terminated and the substrate polymer recovered if desired. Alternatively, the grafting reaction may be initiated without intermediate recovery of the substrate polymer (I).

The graft copolymer is prepared by polymerization of the first grafting monomer or mixture of monomers and the second copolymerizable monomer in the presence of the rubbery substrate polymer (I) according to techniques that are also well known. Such polymerization is additionaly normally carried out in an emulsion polymerization process in the presence of initiator, chain transfer agents, emulsifiers, antioxidants, etc. as is well known in the art.

The amount of grafted copolymer (II) contained in the graft copolymer elastomers of the invention may additionally vary over rather wide ranges. Suitable graft levels expressed as weight ratio of chemically attached graft to substrate (G/R) are from about 10 to about 1/100.

The graft copolymer elastomers of the invention are advantageously employed in the preparation of blends, particularly blends with thermoplastic resins containing reactive polar functionality. Non-limiting examples of the latter compositions include copolymers of an ethylenically unsaturated monomer and a copolymerizable carboxylic acid or carboxylic acid anhydride. Specific examples include copolymers of a monovinylidene aromatic monomer, e.g. styrene, α-methylstyrene, etc. with acrylic acid, methacrylic acid, maleic anhydride, and interpolymers of two or more of the above monomers with additional ethylenically unsaturated polymerizable monomers. Preferred blends are prepared with interpolymers of styrene and acrylic acid, methacrylic acid or maleic anhydride, and optionally methylmethacrylate e.g. styrene/maleic anhydride, styrene/maleic anhydride/methylmethacrylate, or styrene/methylmethacrylate/methacrylic acid interpolymers.

Where the graft copolymers are particularly usefully employed as impact modifiers it is desirable that the finished copolymer elastomer retain the particulate structure of the rubbery substrate polymer. Preferably, the volume average particle size of the graft copolymer elastomers is within the previously described size range of 0.03 to 3.0 micrometers, preferably from 0.1 to 2.0 micrometers.

Where desired, the blends of the graft copolymer elastomers of the present invention and reactive polar copolymers may be prepared by any suitable technique. Most expeditiously, the two polymers are merely blended with sufficient intensity to cause melting of the two components and functionalizing reactions between the graft copolymer elastomers and the reactive polar copolymer. A small but effective amount of the promoter of the functionalizing reaction such as Lewis acid may additionally be present if desired. The presence of such a functionalizing reaction promoter results in improved reactivity of functional groups of the graft copolymer elastomer and improved impact resistance of the resulting blend. The amount of such functionalizing reaction promoter to be employed is not critical to the invention as long as a sufficient amount is used to improve the reaction between the pendant reactive groups of the graft copolymer and the polar copolymer. Suitable amounts may vary on a weight percent basis from about 0.01 percent to about 5 percent based on total weight of the resin blend.

SPECIFIC EMBODIMENTS

Having described the invention, the following examples are provided as further illustrated and are not to be construed as limiting. Where provided, parts and percentages are expressed as parts and percentages by weight.

A 1-gallon glass reactor is charged with 1752.3 g of a dispersion of a rubber latex. The latex dispersion contains 580 g rubber solids, which solids represent 5 percent styrene, 93 percent butadiene and 2 percent acrylonitrile, and are a mixture of particles of 0.14µ and 0.8µ volume average particle size. The reactor is flushed with nitrogen and heated while under agitation at 150 rpm. When the reactor temperature reaches 80° C., an aqueous stream containing 2.034 percent dodecylbenzene sulfonate and 0.124 percent sodium persulfate is added over 6 hours at the rate of 112 g/hr. Simultaneously with the aqueous stream is added a monomer stream containing about 68.08 percent styrene, 26.48 percent acrylonitrile, 4.98 percent 2-isopropenyl-2-oxazoline (IPO) and 0.46 percent n-octyl mercaptan over a 6-hour period at the rate of 116 g per hour. The reaction mixture is heated at a reactor temperature of 80° C. for an additional 1 hour. The mixture is then steam stripped in order to remove residual monomers. To the mixture is added 2.5 g of alkylated polyphenols (Topanal® CA, available from Canadian Industries) and 7.6 g dilauryl thiodipropionate. The graft-functionalized latex dispersion is freeze coagulated, separated, and air dryed. The polymer contains 48.52 percent rubber, 26.64 percent grafted rigid phase and 24.84 percent non-grafted rigid phase. This graft copolymer elastomer containing about 5 percent IPO in rigid phase is named grafted copolymer Run 1 as shown in Table I.

Additional graft copolymer elastomers are prepared having different ratios of styrene to acrylonitrile (Run 2), a styrene/2-isopropenyl-2-oxazoline, graft copolymer (Run 3), a styrene/acrylonitrile/glycidyl methacrylate graft copolymer (Run 4) and comparative graft copolymers containing only styrene/acrylonitrile or polystyrene graft (Runs 5 and 6). A summary of various properties of the graft copolymers is contained in Table I.

TABLE I
GRAFT COPOLYMER ELASTOMERS

| GRAFT COPOLYMER RUN | TYPE[1] | S/AN[2] | IPO[3] | GMA[4] | % RUBBER |
|---|---|---|---|---|---|
| 1 | SANIPO | 72/28 | 5 | 0 | 48.5 |
| 2 | SANIPO | 83/17 | 2 | 0 | 48.3 |
| 3 | SIPO | 100/0 | 2 | 0 | 48.9 |
| 4 | SANGMA | 72/28 | 0 | 8.5 | 77.2 |
| 5* | SAN | 72/28 | 0 | 0 | 49.20 |
| 6* | PS | 100/0 | 0 | 0 | 52.0 |

[1]The Graft is any of the following compositions:
 i. terpolymer of styrene, acrylonitrile and 2-isopropenyl-2-oxazoline (SANIPO).
 ii. copolymer of styrene and 2-isopropenyl-2-oxazoline (SIPO).
 iii. terpolymer of styrene, acrylonitrile and glycidyl methacrylate (SANGMA).
 iv. copolymer of styrene and acrylonitrile (SAN).
 v. homopolymer of styrene (PS).
[2]Ratio of styrene to acrylonitrile.
[3]Percent of 2-isopropenyl-2-oxazoline.
[4]Percent of glycidyl methacrylate in graft.
*Not an example of the invention.

The graft copolymer elastomers identified in Table I are dry blended with a styrene acrylic acid copolymer containing acrylic acid in amounts as described in Table II and then melt blended via a two roll mill under the following conditions: temperature of front roll is 390° F., temperature of rear roll is 320° F., preheating 1.5 minutes and compounding 5.5 minutes. The blends are ground and compression molded at 400° F. into test bars. Physical properties are tested following the standard ASTM methods and reported in Table II. All blends contain 20 percent rubber.

TABLE II
PROPERTIES OF BLENDS OF VARIOUS GRAFT COPOLYMERS WITH STYRENE/ACRYLIC ACID

| Graft Copolymer Run (Type) | % acrylic acid[1] | Izod Impact[2] | Vicat(c) |
|---|---|---|---|
| 1 (SANIPO) | 1 | 1.18 | 107 |
| 2 (SANIPO) | 1 | 1.31 | 107 |
| 2 (SANIPO) | 15 | 1.96 | 127 |
| 5* (SAN) | 1 | 0.13 | 105 |
| 5* (SAN) | 15 | 0.24 | 126 |
| 3 (SIPO) | 15 | 2.25 | 128 |
| 3 (SIPO) | 8 | 2.58 | 117 |
| 3 (SIPO) | 3 | 2.43 | 108 |
| 3 (SIPO) | 1 | 1.78 | 106 |
| 6* (PS) | 15 | 0.43 | 126 |

*Not an example of the invention.
[1]Percentage of matrix phase.
[2]ft-lbs/in.

It is seen by comparison of the results contained in Table II that a graft copolymer elastomer having a styrene/2-isopropenyl-2-oxazoline copolymer grafted phase or a styrene/acrylonitrile/2-isopropenyl-2-oxazoline copolymer grafted phase results in an improved impact resistant blend when blended with styrene/acrylic acid copolymer compared to polystyrene or styrene/acrylonitrile grafted elastomer. Moreover, the data further demonstrates that the grafted copolymer elastomer may be blended with styrene/acrylic acid copolymers having a wide range of acrylic acid content and consequently a wide variation in polarity.

EXAMPLE 2

The graft copolymer elastomers of Runs 3 and 6 are combined in a nonequimolar styrene malic anhydride copolymer to provide a rubber level of 20 percent. The mixture is melt blended in a manner substantially the same as that disclosed in Example 1, and the products tested for physical properties. The maleic anhydride content of the nonequimolar random copolymer of styrene and maleic anhydride is 21 percent. Results obtained by testing of physical properties are contained in Table III.

TABLE III

| Graft Copolymer Run (type) | lbs/in. | Izod Impact (ft. Viacat (°C.) |
|---|---|---|
| Run 6* (PS) | 0.9 | 136 |
| Run 3 (SIPO) | 1.75 | 138 |

*Not of the present invention.

It is seen that improved compatibility of the rubber phase is obtained by use of the graft copolymers of the present invention in a copolymer containing maleic anhydride.

EXAMPLE 3

Blends of the glycidyl methacrylate functional elastomer of Run 4 and Comparative Run 5 are prepared by procedure substantially the same as that disclosed in Example 1. All blends contained 20 percent by weight elastomer. Results of the comparison of physical properties of the blends are provided in Table IV.

TABLE IV

| Graft Copolymer Run (type) | % AA | Impact[1] |
|---|---|---|
| SAN | 1 | 0.13 |
| SANGMA | 1 | 2.47 |

[1]Izod impact ft. lbs/in.
*Not of the present invention.

It is seen that the use of glycidyl methacrylate to provide pendant functional groups in a graft copolymer also results in improved compatibility between the grafted rubber and the styrene/acrylic acid copolymer matrix.

EXAMPLE 4

To illustrate the effect of functionalizing reaction promoters in improving compatibility between the grafted copolymers of the invention and matrix copolymers, a mixture containing graft copolymer elastomer, styrene acrylic acid matrix and a small amount of a Lewis acid promoter (zinc chloride) is prepared and melt blended according to the technique previously described in Example 1. Physical properties are tested and reported in Table V.

TABLE V

| Graft Copolymer Run | (type) | % ZnCl$_2$ | % AA | Impact[1] |
|---|---|---|---|---|
| 2 | (SANIPO) | 0 | 1 | 1.31 |
| 2 | (SANIPO) | 0.3 | 1 | 1.91 |
| 3 | (SIPO) | 0 | 1 | 1.78 |
| 3 | (SIPO) | 0.16 | 1 | 2.67 |

[1]Izod Impact ft. lbs/in.

By comparison of the results obtained in Table V, it is seen that improved compatibility between the grafted copolymer elastomer and the matrix copolymer is achieved by additionally incorporating a Lewis acid promoter into the resin blend.

What is claimed is:

1. A thermoplastic polymer blend comprising a polar matrix copolymer which is a copolymer of styrene and acrylic acid, methacrylic acid or maleic anhydride and a graft copolymer elastomer comprising a rubbery substrate polymer (I) having grafted thereto a copolymer (II) comprising the reaction product of a first monomer selected from the group consisting of monovinylidene aromatic monomers, ethylenically unsaturated nitrile functional monomrs, ethylenicaly unsaturated carboxylic acid esters having 1 to 4 carbons in the ester group, and mixtures thereof and from 0.1 to 10 percent by weight of a copolymerizable comonomer containing pendant cyclic ether or cyclic iminoether functionality corresponding to the formulae:

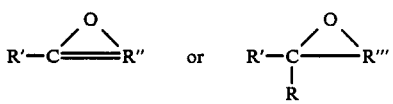

wherein R' is an ethylenically unsaturated addition polymerizable aliphatic radical of up to 8 carbons; R" is a trivalent aliphatic moiety of up to 12 carbons; R''' is a divalent aliphatic moiety of up to 12 carbons; and R is hydrogen, halogen or a $C_{1-4}$ alkyl group, said percentages being based on total first monomers and copolymerizable comonomer weight.

2. A blend according to claim 1, wherein the rubbery substrate polymer (I) has a $T_g$ of less than about 0° C.

3. A blend according to claim 1, wherein the rubbery substrate polymer (I) is selected from the group consisting of homopolymers and copolymers of diolefins, copolymers of ethylene and at least one α-olefin containing at least three carbons, interpolymers of ethylene, at least one α-olefin containing at least three carbons, and a diene, and acrylate rubbers.

4. A blend according to claim 1, wherein the rubbery substrate polymer (I) is a polymer of butadiene prepared by emulsion, suspension, solution, or mass polymerization.

5. A blend according to claim 4, wherein the rubbery substrate polymer (I) contains at least about 60 percent by weight butadiene.

6. A blend according to claim 1, wherein the rubbery substrate has a volume average particle size distribution from about 0.03 to about 3.0 micrometers.

7. A blend according to claim 1, wherein the rubbery substrate has a volume average particle size distribution from about 0.1 to about 2.0 micrometers.

8. A blend according to claim 1, wherein the ethylenically unsaturated comonomer containing pendant cyclic ether or iminoether functionality is a 2-alkenyl-2-oxazoline or glycidyl methacrylate.

9. A thermoplastic polymer blend according to claim 1, additionally comprising a promoter of the functionalizing reaction.

10. A thermoplastic polymer blend according to claim 9, wherein the promoter is a Lewis acid.

11. A thermoplastic polymer blend according to claim 10, wherein the Lewis acid comprises from about 0.01 to 5 percent by weight based on total weight of the blend.

12. A thermoplastic polymer blend according to claim 10, wherein the Lewis acid is ZnCl$_2$.

* * * * *